United States Patent
Cai et al.

[11] Patent Number: 6,134,246
[45] Date of Patent: Oct. 17, 2000

[54] INVERSE MULTIPLEXING WITHIN ASYNCHRONOUS TRANSFER MODE COMMUNICATION NETWORKS

[75] Inventors: Biaodong Cai; Pradeep Dinkar Samudra, both of Plano, Tex.

[73] Assignee: Samsung Electronics Co., Ltd., Rep. of Korea

[21] Appl. No.: 09/013,380

[22] Filed: Jan. 26, 1998

[51] Int. Cl.[7] ............................ H04L 12/28; H04L 12/56; H04J 3/04

[52] U.S. Cl. ......................... 370/474; 370/394; 370/395; 370/535; 395/200.6

[58] Field of Search ...................................... 370/474, 395, 370/535, 389, 394, 536, 471, 408, 476, 477, 465, 466, 505, 516; 395/200.6

[56] References Cited

U.S. PATENT DOCUMENTS

| | | | |
|---|---|---|---|
| 5,065,396 | 11/1991 | Castellano et al. | 370/84 |
| 5,608,733 | 3/1997 | Vallee et al. | 370/394 |
| 5,742,765 | 4/1998 | Wong et al. | 395/200.6 |
| 5,748,614 | 5/1998 | Wallmeier | 370/235 |
| 5,875,192 | 2/1999 | Cam et al. | 370/474 |
| 5,970,067 | 10/1999 | Sathe et al. | 370/394 |
| 6,002,670 | 12/1999 | Rahman et al. | 370/328 |

*Primary Examiner*—Huy D. Vu
*Assistant Examiner*—M. Phan
*Attorney, Agent, or Firm*—John C. Han, Esq.

[57] ABSTRACT

Software inverse multiplexing within an Asynchronous Transfer Mode (ATM) communication network is provided by a first ATM switch receiving a stream of ATM cells over a high bandwidth communication link. A Segmentation and Re-assembly (SAR) module associated with the first ATM switch thereafter reassembles the received ATM cells into corresponding user packets. Control data identifying the sequence of assembled user packets are added to each user packet and de-assembled into corresponding ATM cells. The de-assembled ATM cells are then communicated over a plurality of low bandwidth communication links to a second ATM switch. The second ATM switch receives the transmitted ATM cells over said low bandwidth communications links. A SAR module associated with the second ATM switch thereafter reassembles the received ATM cells into corresponding user packets. Utilizing the enclosed control data, received user packets are re-synchronized into their original sequence. The control data are then removed and the user packets are de-assembled back into corresponding ATM cells. The de-assembled ATM cells are then communicated over an outgoing high bandwidth communication link.

24 Claims, 10 Drawing Sheets

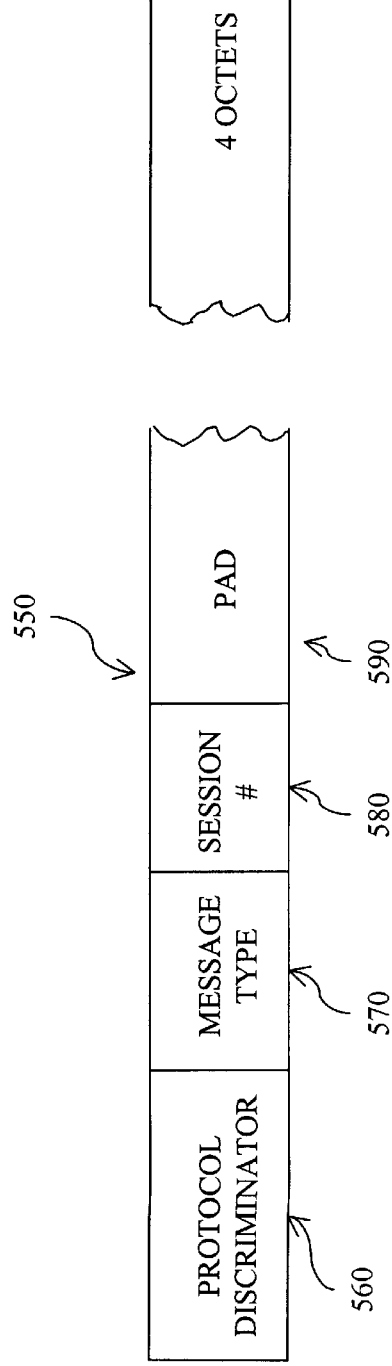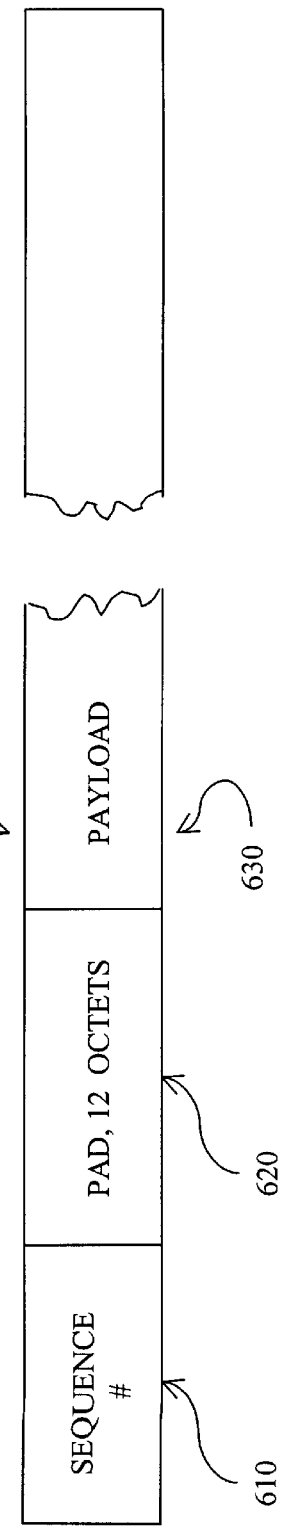
FIGURE 8
FIGURE 9

INVERSE MULTIPLEXING WITHIN ASYNCHRONOUS TRANSFER MODE COMMUNICATION NETWORKS

BACKGROUND OF THE INVENTION

1. Technical Field of the Invention

The present invention relates to packet communications and, in particular, to the inverse multiplexing of asynchronous transfer mode (ATM) cells within ATM communication networks.

2. Description of Related Art

Historically, separate methods and protocols were used for transporting information within a Local Area Network (LAN) versus a Wide Area Network (WAN). Due to a large number of separately controlled and configured networks, such a distinction between the associated networks created inter-working problems as user data are transported between multiple incompatible networks. As a result, the Asynchronous Transfer Mode (ATM) standard has been introduced as a worldwide standard to allow interoperability of information, regardless of the "end-system" or type of information, between associated networks. Using ATM, user information to be sent is segmented into fixed length cells, and transported to and re-assembled at the destination. Being fixed length allows the cells to be transported in a predictable manner through the network and enables the associated switches and transportation mechanisms to achieve high-speed and flexible communications.

Now referring to FIG. 1, there is shown a block diagram of an ATM network 10 illustrating two ATM switches with multiple narrow bandwidth T-1 communication lines connected therebetween. A first ATM switch 20 receives a stream of ATM cells over a high-bandwidth incoming communication link 30, such as an OC-3. Although it is desirable to switch the received cells over another high band-width connection to a second ATM switch 50, due to a lack of communication resources, the first ATM switch 20 may have to utilize other lower speed communication links. As an illustration, the first ATM switch 20 transmitted the received cells over multiple slower speed T-1 links 40 to the second ATM switch 50. T-1/E-1 communication links have been commonly utilized by a Public Switched Telephone Network (PSTN) to transport voice and data within the United States, as well as world-wide, and are already well placed and available throughout service areas. With no other connections available, the first ATM switch 20 partitions (de-assembles or distributes) the received ATM cells and transmits the de-assembled cells over a number of slower T-1/E-1 communication links to the second ATM switch 50. The second ATM switch 50 thereafter re-assembles and re-synchronizes the cells received over the multiple T-1 communication links. The second ATM switch 50 then transmits the re-assembled ATM cells over an outgoing high bandwidth communication link, such as another OC-3 link 60. Such a process of de-assembling and re-assembling cells communicated over multiple communication links is known as inverse multiplexing.

However, performing inverse multiplexing in a conventional manner is inefficient and expensive. Existing hardware components with each ATM switch need to be modified or reconfigured. Furthermore, an additional inverse multiplexing chip or module needs to be added to de-assemble the cells received over a high band-width communication link and to re-assemble the cells received over a number of slower band-width communication links. Otherwise, the sequence of cells within a communicated stream may be altered and the integrity of the transmitted data destroyed. Unfortunately, making such changes to the associated hardware components within each ATM switch are expensive and inefficient. For example, it requires a new physical sub-layer called Inverse Multiplexing for ATM (IMA) Transmission Convergence Sub-layer (IMA TC) between the presently defined TC sub-layer and ATM layer.

Accordingly, there is a need for a mechanism to provide more efficient and easier inverse multiplexing.

SUMMARY OF THE INVENTION

The present invention provides a method and apparatus for inverse multiplexing a stream of asynchronous transfer mode (ATM) cells received from a high-bandwidth communication link over a plurality of low-bandwidth communication links. An Inverse Multiplexing for ATM (IMA) implementation in accordance with the teachings of the present invention includes a transmitter (a first ATM switch), a receiver (a second ATM switch), a plurality of low-bandwidth communication links connected therebetween, protocols between the transmitter and the receiver, a load balancing algorithm at the transmitter, and a circular re-sequencing algorithm at the receiver. A stream of ATM cells are received over an incoming high-bandwidth communication link and assembled into associated packets by a segmentation and re-assembly (SAR) module located within the first ATM switch. A central processing unit (CPU) associated with the SAR module thereafter adds control data within each packet to identify the position of said packet with respect to the rest of the packets received or to be received by the first switch. The modified packets are then de-assembled by the SAR module into a stream of ATM cells and transmitted over the plurality of low-bandwidth communication links by the transmitter. While utilizing the multiple low-bandwidth communication links, ATM cells associated with a particular packet are transmitted over the same low-bandwidth communication link.

A load-balancing algorithm associated with the first ATM switch selectively determines a communication link to transport the ATM cells associated with the next packet to be transmitted in an attempt to evenly distribute the received payload over the plurality of available low-bandwidth communication links.

The second ATM communication switch thereafter receives the transmitted ATM cells over the plurality of low-bandwidth communication links and re-assembles the received ATM cells into corresponding packets. The packets are then re-synchronized into their original sequence by utilizing the sequence number provided within each packet. Such re-sequencing may be performed via a circular re-sequencing algorithm at the receiver. The re-synchronized packets are then de-assembled by a SAR module associated with the second ATM communication switch and transmitted over a connected high-bandwidth communication link, such as an OC-3 communication link.

In one embodiment, the first ATM communication switch comprises a plurality of registers for storing data representing the traffic level associated with each of said plurality of low-bandwidth communication links. The CPU associated with the first ATM communication switch evaluates the plurality of registers to select a low-bandwidth communication link with the lowest traffic level. The ATM cells associated with the next packet to be transmitted are then transmitted over the selected low bandwidth communication link.

In another embodiment, the second ATM communication switch comprises a circular buffer for storing and re-synchronizing packets received over said plurality of low-bandwidth communication links.

In yet another embodiment, the CPU associated with the first ATM communication switch stores a session number within each of said packet for identifying a virtual connection that has been established between said first ATM communication switch and said second ATM communication switch for transporting such cells.

BRIEF DESCRIPTION OF THE DRAWINGS

A more complete understanding of the method and apparatus of the present invention may be had by reference to the following detailed description when taken in conjunction with the accompanying drawings wherein:

FIG. 8 is a data diagram of an IMA message packet storing a session number for establishing a virtual connection between a first ATM switch and a second ATM switch;

FIG. 9 is a data diagram of an IMA packet storing a sequence number for transporting a payload in accordance with the teachings of the present invention;

DETAILED DESCRIPTION OF THE DRAWINGS

Figure 1:
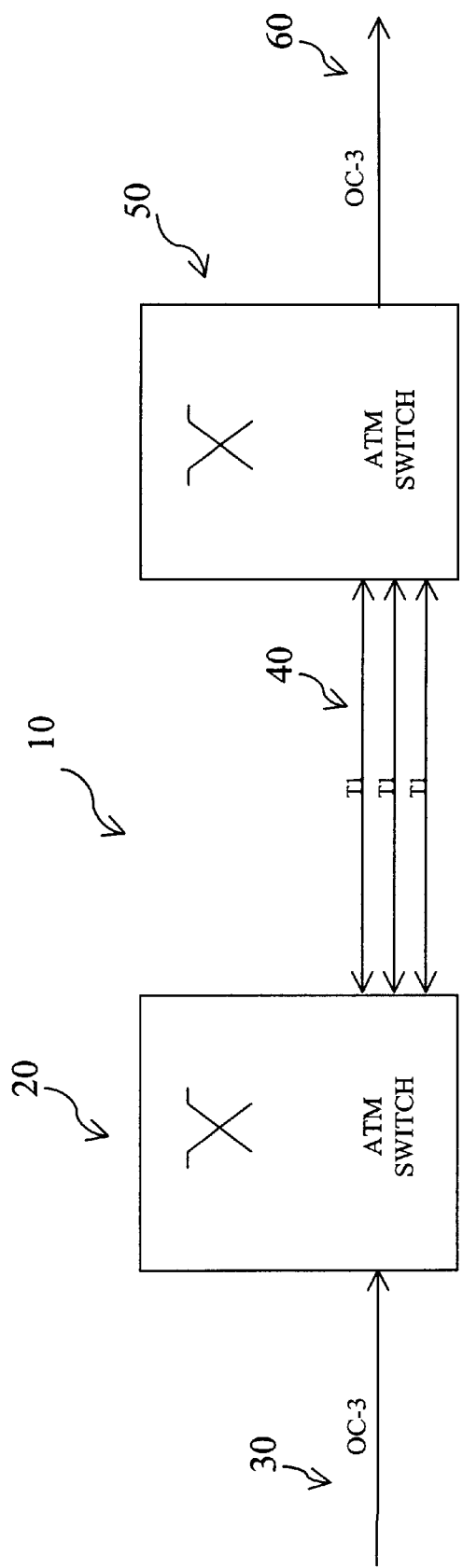
FIG. 1, as described above, is a block diagram of an Asynchronous Transfer Mode (ATM) network illustrating two ATM switches with multiple narrow-bandwidth T-1 communication links connected therebetween.
Figure 2:
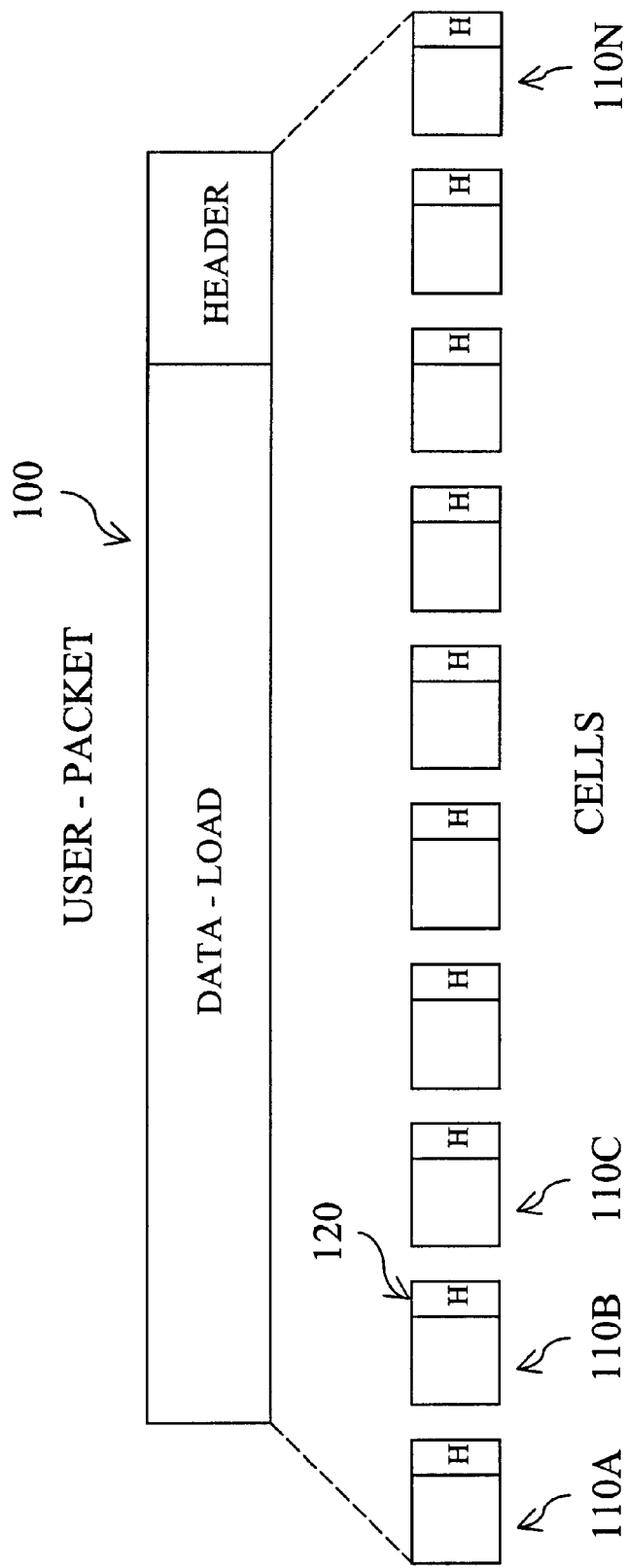
FIG. 2 is a block diagram of a user packet de-assembled into a plurality of fixed sized ATM cells.

FIG. 2 is a block diagram of a user packet 100 de-assembled into a plurality of fixed sized ATM cells 110. The user packet 110, such as an ATM Adaptation Layers (AAL) 5 packet, has a variable payload size. The AAL5 packet 110 is then divided or split into a plurality of ATM cells 110A–110N as illustrated. ATM technology as previously described is based on a standard fifty-three (53) bytes or octet (8 bit) cell. The first five bytes carry control information and are referred to as the "header" 120 of the cell. The remaining forty-eight (48) bytes carry user information or payload. Accordingly, a necessary number of ATM cells are used to accommodate the payload required by the AAL5 packet 110. The ATM cells associated with the original AAL5 packet are then transmitted from the originating switch to the destination switch. Once all of the ATM cells are delivered to the final destination point, the receiver switch re-assembles the ATM cells into the original AAL5 user packet. The included payload is then utilized to effectuate a communication therebetween.

Figure 3:
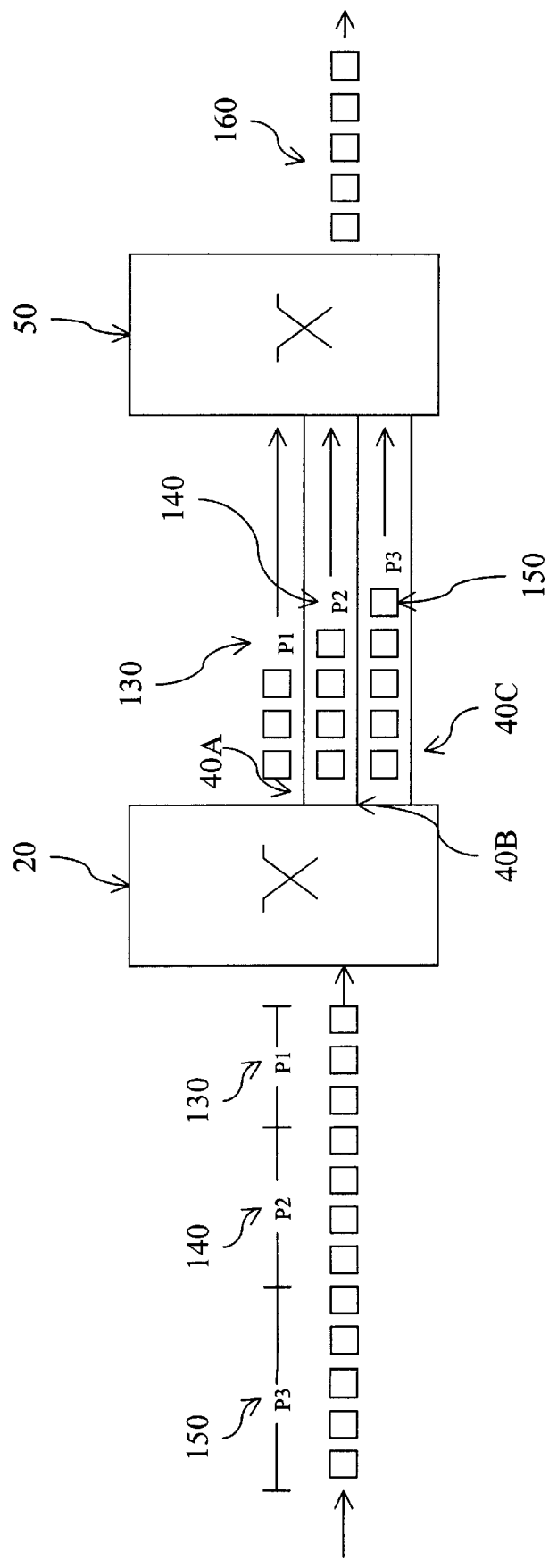
FIG. 3 is a block diagram of an ATM network illustrating two ATM switches effectuating inverse multiplexing in accordance with the teachings of the present invention.

FIG. 3 is a block diagram of an ATM network illustrating two ATM switches effectuating inverse multiplexing in accordance with the teachings of the present invention. The idea of ATM inverse MUX is to use several small capacity transmission lines to accommodate a large bandwidth connection. The software inverse MUX in accordance with the teachings of the present invention is to deal with ATM traffic at the AAL packet level. At the connection setup time, when the routing algorithm or the system administrator determines that only narrow bandwidth communication links are available while the bandwidth of the requested connection is greater than any one available bandwidth rate, the administrator triggers an inverse MUX connection setup. Referring to FIG. 3, three different T-1 communication links, each with 1.5 Mbps rate, are then utilized between the first ATM switch 20 and the second ATM switch 50 to accommodate a requested bandwidth of 4 Mbps.

There are several challenges to an inverse MUX design. The ATM hardware guarantees data integrity by not altering the sequence of ATM cells transmitted over a signal virtual connection (VC). Because of the above guarantee and the connection-oriented nature, an ATM cell does not carry any sequence information therein. As a result, the destination ATM switch is not require to re-synchronize the cells. However, when a plurality of ATM cells received over a particular VC (such as an OC-3) are divided and transmitted over a plurality of VCs (such as multiple T-1 lines), the receiving switch may receive the cells out of order. Since the cells themselves do not contain any sequence or order number, the receiving switch then has no means to properly re-synchronize the received cells into proper order and guarantee the above guaranteed data integrity.

In accordance with the teachings of the present invention, when ATM cells are received over a large bandwidth connection, cells are grouped into associated user packets. The ATM cells belonging to each user packet are then transmitted over a particular low bandwidth connection. As an example, ATM cells 130 representing the first user packet P1 are grouped together and transmitted over one of the plurality of T-1 communication links 40A. While transmitting the first user packet, the first ATM switch adds a sequence number to the packet. Similarly, ATM cells 140 associated with the second user packet P2 are transmitted over another T-1 communication links 40B. ATM cells 150 associated with the next user packet P3 are also similarly transmitted over the last T-1 communication link 40C. Once the transmitted ATM cells are received by the second ATM switch, the ATM cells are again assembled back into their associated user packets. Utilizing the sequence number stored within each received packet, the second ATM switch 40 then re-synchronizes the three user packets into their original sequence. The properly synchronized user packets are then de-assembled into appropriate number of ATM cells 160 and transmitted over an outgoing high bandwidth OC-3 communication link.

Figure 4:
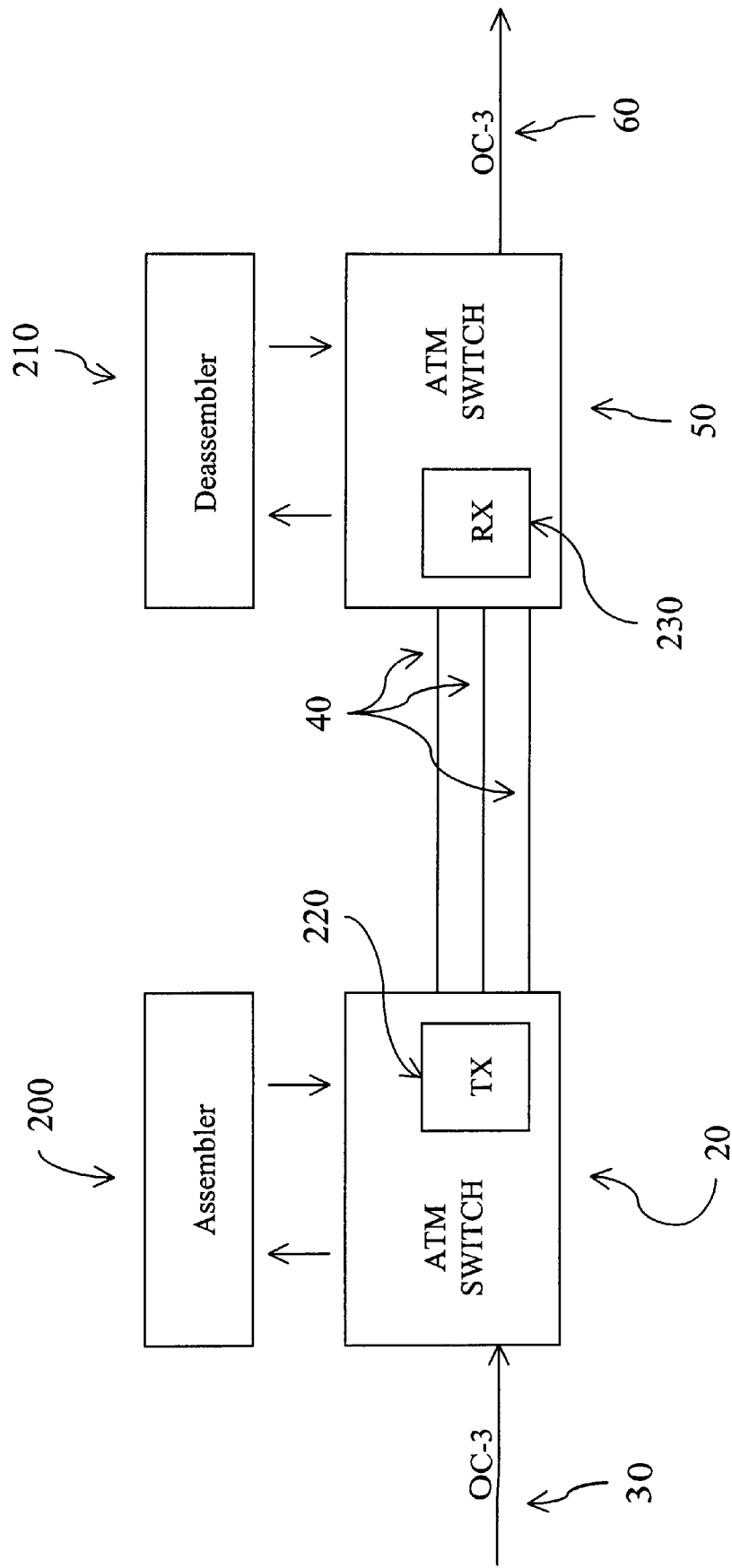
FIG. 4 is a block diagram further illustrating the transmission of ATM cells received over an incoming high-bandwidth communication link to a plurality of low-bandwidth communication links in accordance with the teachings of the present invention.

FIG. 4 is a block diagram further illustrating the transmission of ATM cells received from an incoming high-bandwidth communication link over a plurality of low-bandwidth communication links in accordance with the teachings of the present invention. ATM cells received over an incoming high bandwidth communication link 30, such as a OC-3, are assembled by an assembler 200 associated with the first ATM switch 20. ATM cells determined to be associated with a particular user packet, such as an AAL5 packet, are then transmitted by a transmitter 220 over one of the low bandwidth communication links to the second ATM switch 50. A receiver 230 associated with the second ATM switch 50 receives the transmitted ATM cells over the T-1 line and forwards them to a deassembler 210. The deassembler 210 waits until all of the ATM cells associated with the particular user packet are received and re-transmits them over an outgoing high bandwidth OC-3 communication link 60.

Figure 5:
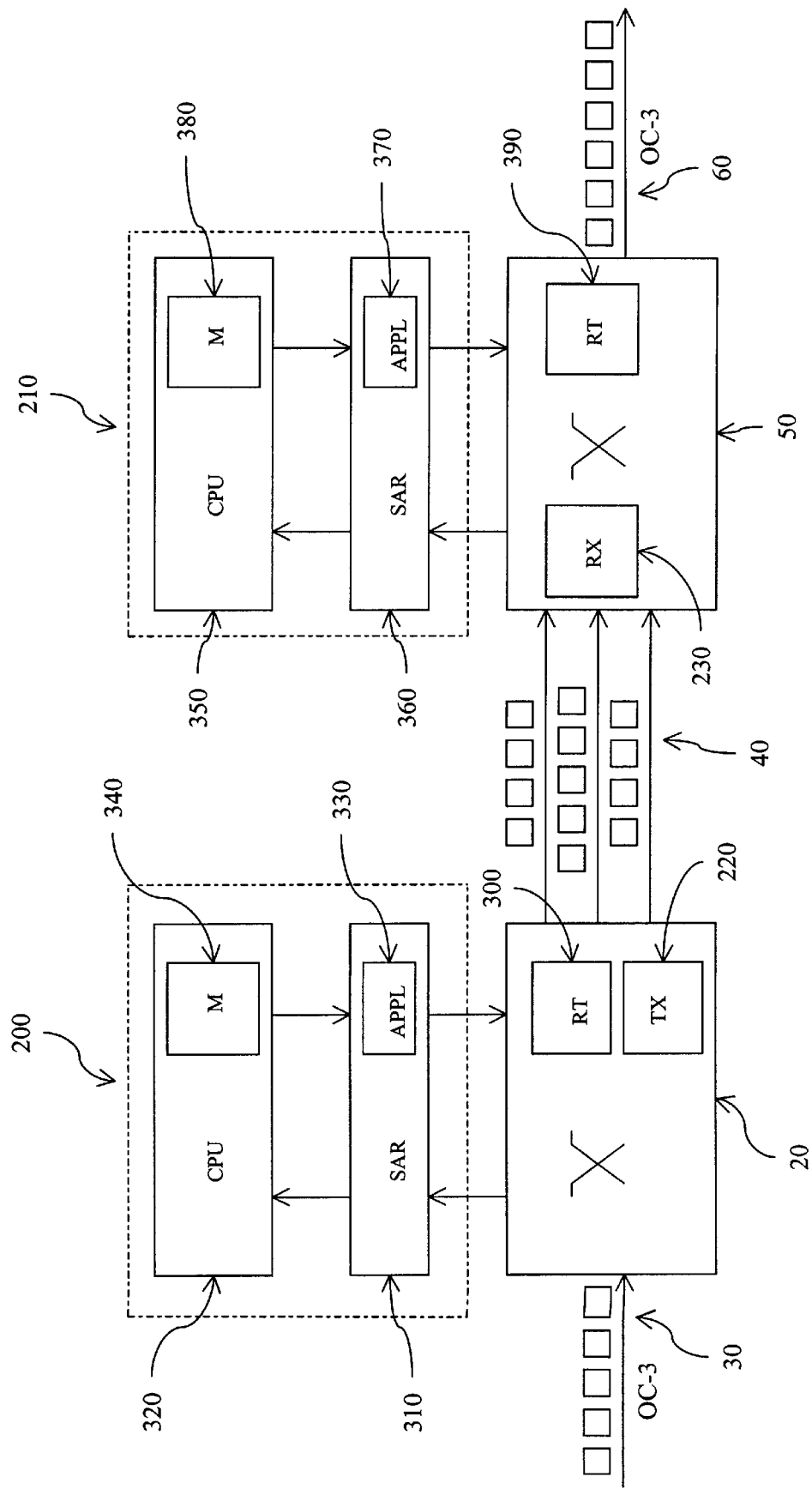
FIG. 5 is a block diagram of an ATM network illustrating Central Processing Units (CPUs) and Segmentation and Re-assembly (SAR) modules associated with two ATM switches for performing the inverse multiplexing.

FIG. 5 is a block diagram of an ATM network illustrating Central Processing Units (CPUs) and Segmentation and Re-assembly (SAR) modules associated with two ATM switches for performing the software inverse multiplexing. ATM cells are received by the first ATM switch, such as Samsung STARacer ATM switch, over an OC-3 communication link 30. A routing table (RT) 300 then forwards the received ATM cells to a first Segmentation and Re-assembly (SAR) module or chip 310. A first application module 330 associated with the SAR module 310 then assembles the cells into an AAL5 packet and performs a CRC32 check. If the assemble packet is a "good" packet, the SAR module 310 then interrupts an associated central processing unit (CPU) 320 and places the assembled AAL5 packet into a first designated memory location 340. The CPU 320 then adds a sequence number to the placed Protocol Data User (PDU) or AAL5 packet and selects a T1 communication link 40 to communicate the packet. While selecting an outgoing communication link, the CPU selects a T1 link with the lowest traffic load using a load-balancing algorithm. The PDU or AAL5 packet with the sequence number stored therein is then communicated back down to the SAR module 310. The SAR module 310 de-assembles the user packet into a number of ATM cells and communicates all of the de-assembled ATM cells associated with the particular user packet over the selected T-1 communication link 40.

In a similar fashion, the receiver 230 associated with the second ATM switch 50 receives the ATM cells communicated over one of the T-1 communication links 40 and forwards them to a second SAR module 360 associated therewith. A second application module 370 associated with the second SAR module 360 then reassembles the received ATM cells into a PDU or AAL5 packet and places it in a designated memory location 380. A CPU 330 associated with the second ATM switch 50 re-sequences the received AAL5 or PDU packet with other packets received over other T-1 communication links and transmits them back down to the second SAR module 360. The second SAR module 360 then de-assembles the AAL5 packets into a number of ATM cells and utilize a routing table 390 to transmit the cells over an outgoing OC-3 communication link 60 in a conventional manner.

The above illustration is to represent an uni-directional connection. As a result, the first ATM switch 20 is referred to as the "transmitter" and the second ATM switch 50 is referred to as the "receiver." For a bi-directional connection or communications, two pairs of transmitters and receivers are utilized in a similar manner.

Figure 6:
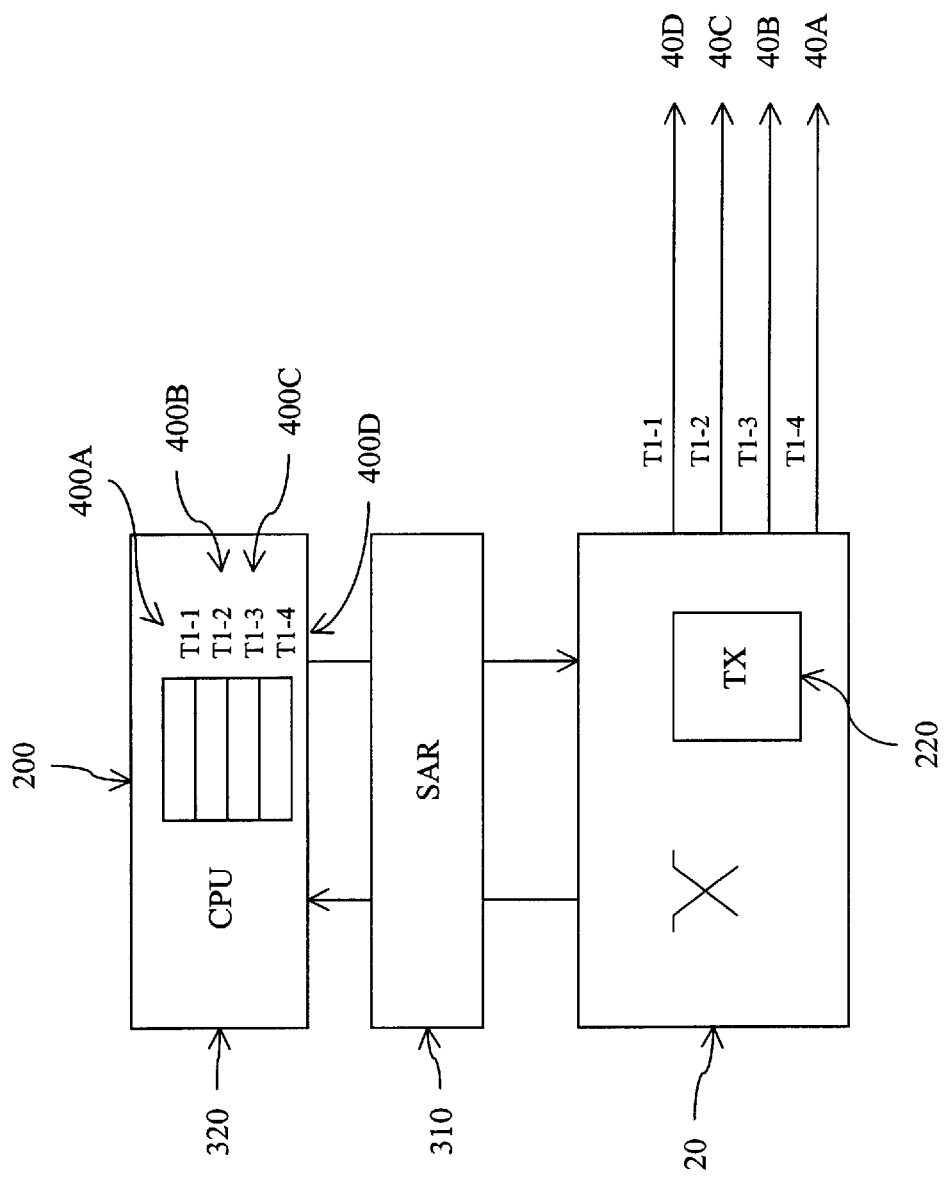
FIG. 6 is a block diagram of an ATM switch associated with a plurality of registers for keeping track of the traffic level associated with the plurality of low-bandwidth communication links.

FIG. 6 is a block diagram of an ATM switch 20 coupled to a plurality of registers 400A–400D for keeping track of the traffic level associated with the plurality of low bandwidth communication links 40A–40D. Registers such as random access memory (RAM) devices 400A, 400B, 400C, and 400D are maintained by the associated CPU 320 for keeping track of the current traffic level associated with low band-width communication links 40A, 40B, 40C, and 40D, respectively. In accordance with the teachings of the present invention, when the SAR 310 re-assembles the received ATM cells into a user packet and informs the associated CPU 320 thereof, the CPU evaluates the registers 400A–400D to determine the appropriate low bandwidth communication link to transmit the packet. As one embodiment, the CPU selects a communication link associated with a register with the lowest traffic level value stored therein. This is to select a T1 link that has been least utilized. After the transmission, the associated register is then updated to represent the current traffic level status of the determined T1 communication link. As another embodiment, another algorithm could be utilized to rotatively select the available links to evenly distribute the cells over the available T-1 communication links.

For implementing a software inverse multiplexing in accordance with the teachings of the present invention, a method and means for determining the number of T-1 connections needed for accommodating the bandwidth received over the OC-3 incoming communication link is also needed. Accordingly, the two ATM switches need to determine how many T1 virtual connections (VCs) are needed to support the ATM cells received over the OC-3 VC. In order to accommodate an original OC-3 VC with a peak cell rate (PCR) of N Mbps, M number of T1 VCs are needed wherein N/M is less than the T1 rate (N/M<T1 rate) and N/(M−1) is greater than the T1 rate (N/(M−1)>T1 rate). As a result, each allocated T1 would have more than fifty percent (50%) of its bandwidth utilized by the T1 VC. The lower value between (N/M*(1+10%)) and the T1 rate is then assigned as the PCR and Sustainable Cell Rate (SCR) for the selected T1 VCs. No UPC (policing) is implemented under T1 lines at the receiver end.

After allocating the required number of T1 VCs, incoming ATM cells are evenly or optimally distributed across the allocated T1 communication links using a distribution algorithm as described above.

In accordance with the teachings of the present invention, there are two different embodiments for establishing a virtual connection over a T-1 link between the two ATM switches and effectuating communication therebetween. The first embodiment utilizes the same message format for establishing a virtual connection and for transporting data between the two ATM switches. The second embodiment utilizes a first message format for establishing a virtual connection and a second message format for transporting data therebetween.

Figure 7:
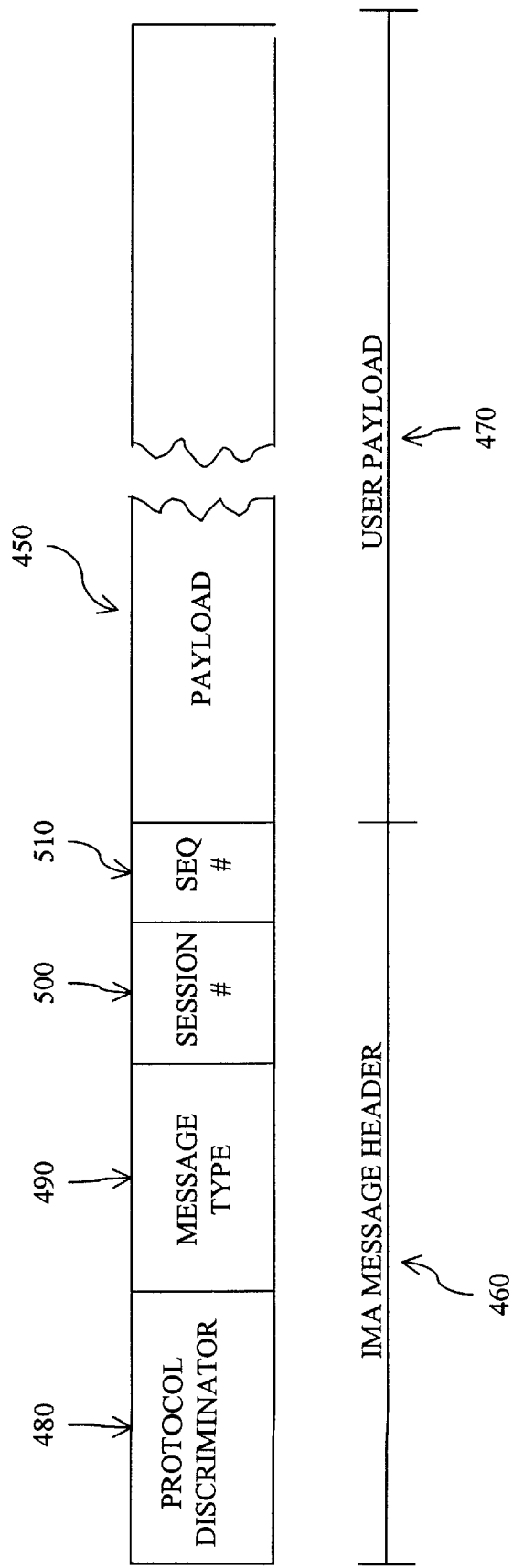
FIG. 7 is a block diagram of an IMA message packet with session and sequence data for effectuating the inverse multiplexing in accordance with the teachings of the present invention.

Reference is now made to FIG. 7 wherein a block diagram of an IMA message packet formatted (first format) in accordance with the first embodiment as mentioned above is illustrated. While establishing a virtual connection between the two ATM switches and transmitting ATM cells over the established VC, both control data and data messages needed to be transported over the same T1 VC. Because a pair of transmitter and receiver can accommodate unidirectional communication, a back channel is needed to carry the control message from the receiver switch to the transmitter switch. Referring to FIG. 7, the IMA message is divided into two sections: IMA message header 460, and the user payload 470. The message header 460 is sixteen (16) octets long and includes a protocol discriminator 480, a message type 490, a session number 500, and a sequence number 510. The protocol discriminator 480 is a 32 bit unsigned integer (UINT). For the present invention, the value of one (0x00000001) may be used to indicate that the communication is being effectuated using the first embodiment. The message type 490 is also a 32 bit UINT (friendly to RISC machine) and indicates the type of message being transmitted between a first switch and a second switch. The following values are predefined as the message types:

0x00000000, Reserved;
0x00000001, Data;
0x00000002, Restart;
0x00000003, Restart Acknowledge (Restart Ack);
0x00000004–0xFFFFFFFF, Reserved.

The session number 500 is a 32 bit UINT as well and represents the session number assigned to the established VC. The sequence number 510 is a 32 bit UINT representing the packet sequence or order number. The sequence number 510 exists only within Data messages. The length information is not needed in the message header because the SAR module properly de-assembles the user packet into a requisite number of ATMs cells. The SAR further performs CRC 32 check, therefore, no bit error checking is needed at this layer.

Since most RISC CPUs have a cache line of 16 bytes, the message header size of sixteen (16) bytes has positive performance implications. Accordingly, a single memory access allows the whole message header (16 bytes) to be read into the CPU cache without reading any of the message body (payload). As a matter of fact, the user data or payload 450 is not touched or processed at all by the switches and the software inverse multiplexing requires a small portion of the CPU time.

The Restart, Restart Ack messages, and the associated session number are used to manage a communication link between the transmitter and the receiver. Before any user data packet can be transmitted, a session must be established therebetween. As an illustration, the transmitter has to send a Restart message with a particular session number. The receiver then adopts the session number provided by the transmitter upon receiving the Restart message and responds with a Restart Ack message. Once the transmitter receives the Restart Ack message, a session has been established and data packets may be communicated therebetween. The first switch then communicates the data by setting the message type to 0x00000001 (Data) and stores the payload into the payload section 470 of the message (data portion). Each message is also numbered with a packet sequence number and the assigned session number.

A session can last as long as both parties want to. A Restart message sent by either party will terminate the present session and establish a new session. As an example, a restart could occur if the receiver sees some severely out of sequence packets or find some large number of AAL5 packets failing the CRC checks. Accordingly, when the receiver transmits a Restart Message, the receiver concedes and attempts to establish a new session. When all of the ATM cells belonging to a particular user packet have been transmitted, the first ATM switch then initiates a Restart to establish a new VC.

Procedures for Transmitter Under First Format:

The transmitter maintains the following variables and timer to maintain the status of the session and the connection:

---

T_Seq_N: which stores the sequence number of the next data message to be sent;
T_Session_N: the present session number;
T_Ses_Init_Timer: a timer which is set after a Restart is sent; and
M_Session_N: the session number received from a Restart or Restart Ack message from the receiver.

The transmitter further includes the following states to maintain the session and the connection:

> Idle: the transmitter is just created and initialized;
> Session Initiated: a Restart is sent, but the corresponding Restart Ack has not yet been received; and
> In Session: a session is established. End user AAL5 packets can be transmitted.

The initial state of a transmitter after the software inverse MUX set up is "idle." A state transition is effectuated by an "event." Most events are triggered by some incoming messages and enable a first state to transition into a second state. The following table illustrates the state machine for the transmitter. For simplicity, in any state, any received event not listed in the table is deemed invalid and is discarded. The state will not be altered.

TABLE 1

| STATE | EVENT | NEW STATE | ACTION |
|---|---|---|---|
| Idle | Restart Sent (A new T_Session_N is chosen) | Session Initiated | Set the T_Ses_Init_Timer |
| Idle | Restart Received | In Session | Send Restart Ack with M_Session_N. Set T_Session_N = M_Session_N, Set T_Seq_N = 0 |
| Session Initiated | Restart Received (This implies a collision of Restart messages, i.e., the transmitter and receiver send Restart messages to each other at the same time.) | Session Initiated | Send Restart with the T_Session_N, reset T_Ses_Init_Timer |
| Session Initiated | T_Ses_Init_Timer expires | Session Initiated | T_Session_N: = T_Session_N + 1; Send Restart with the T_Session_N, reset T_Ses_Init_Timer |
| Session Initiated | Restart Ack received and M_Session_N = T_Session_N | In Session | Set T_Seq_N = 0 Clear T_Ses_Init_Timer |
| Session Initiated | Restart Ack received and M_Session_N <>, T_Session_N | Session Initiated | Discard the message |
| In Session | AAL5 packet received | In Session | Send Data message with T_Session_N and T_Seq_N. T_Seq_N: = T_Seq_N + 1. |
| In Session | Restart received | In Session | Send Restart Ack with M_Session_N. Set T_Session_N: = M_Session_N, Set T_Seq_N = 0 |
| In Session | Restart Sent (A new T_Session_N is chosen) (This event is caused by control or management plane.) | Session Initiated | Set the T_Ses_Init_Timer |

Procedures for Receiver Under First Format:

The receiver switch maintains the following variables to maintain its status and connection:

> R_Seq_N: which stores the sequence number of the next expected Data message;
> M_Seq_N: which is the sequence number of the Data message received;
> R_Session_N: the preset session number;
> R_Ses_Init_Timer: a timer which is set after a Restart is sent; and
> M_Session_N: the session number received from a message from the transmitter.

The receiver has the following states for maintaining its status:

> Idle: the receiver is just created and initialized;
> Session Initiated: a Restart is sent, but the corresponding Restart Ack is not yet received; and
> In Session: a session is established and end user AAL5 packets can be received.

The following table illustrates the state machine for the receiver:

TABLE 2

| STATE | EVENT | NEW STATE | ACTION |
|---|---|---|---|
| Idle | Restart Received | In Session | Send Restart Ack with M_Session_N. Set R_Session_N: = M_Session_N, Set R_Seq_N = 0 |
| Session Initiated | Data message received and M_Session_N <> R_Session_N | Session Initiated | Discard the message |
| Session Initiated | Data message received and M_Session_N = R_Session_N (This implies that the Restart Ack message front the transmitter is slow or is lost, but the transmitter has already accepted the restart request from the receiver) | In Session | Clear R_Ses_Init_Timer Set R_Seq_N = 0 Process the message as if the original state is "In Session" |
| Session Initiated | Restart Received (This implies a collision of Restart messages, i.e., the transmitter and receiver send Restart messages to each other at the same time. The Receiver will slave to transmitter's Restart.) | In Session | Send Restart Ack with the M_Session_N, clear R_Ses_Init_Timer. Set R_Session_N: M_Session_N. Set R_Seq_N = 0 |
| Session Initiated | R_Ses_Init_Timer expires | Session Initiated | R_Session_N: = R_Session_N + 1; Send Restart with the R_Session_N, reset R_Ses_Init_Timer |
| Session Initiated | Restart Ack received and M_Session_N = R_Session_N | In Session | Set R._3Seq_N = 0 Clear R_Ses_Init_Timer |
| Session Initiated | Restart Ack received and M_Session_N <> R_Session_N | Session Initiated | Discard the message |
| In Session | Data message received and M_Session_N <> R Session_N | In Session | Discard the message |
| In Session | Data message received and M_Session_N R_Session_N | In Session | If M_Seq_N < R_Seq_N, (The packet comes too late than circular control algorithm can handle.) then discard the message. If M_Seq_N > R_Seq_N, (The packet comes earlier than it should be. Store in the buffer and wait for other packets to come. Later when other packets come and sequence number is straightened, all the packets will be sent out.) then store the AAL5 packet using the circular control algorithm. If M_Seq_N = R_Seq_N, then use circular control algorithm to see how many AAL5 packets are in sequence now. Send all the un-sequenced AAL5 packets to the destination end user and update R_Seq_N accordingly. |
| In Session | Restart Ack received | In Session | Discard the message |
| In Session | Restart received | In Session | Ask the circular control algorithm to send out all the AAL5 packets stored. Reset the circular control algorithm. Send Restart Ack with M_Session_N. Set R_Session_N: = M_Session_N, Set R_Seq_N = 0 |
| In Session | Restart Sent (A new R_Session_N is chosen) (This event may be | Session Initiated | Set the R_Ses_Init_Timer |

TABLE 2-continued

| STATE | EVENT | NEW STATE | ACTION |
|-------|-------|-----------|--------|
|  | caused by control or management plane. This may also happen when Receiver found the received Data message is severely out of order for a long period of time.) |  |  |

As a second embodiment of the present invention, different message formats can be used for establishing a virtual connection between the two ATM switches and for transporting payload data therebetween. As described above, The second embodiment differs from the first embodiment in the following aspects: (1) it uses an out-of-band control channel for communicating control data; (2) it uses a distinguished synchronization phase from the data transmission phase; and (3) it uses a code split technology which uses different message handlers for different phases. Accordingly, a dedicated bi-directional channel between a transmitter and a receiver is used to carry the control message. Therefore, the control is "out-of-band." The uni-directional T1 virtual connection carries data messages only. In this way, a data message contains only the sequence number of the message and the user payload. Thus, real-time performance is improved.

Reference is now made to FIG. 8 illustrating a control message formatted (second format) in accordance with the second embodiment. The control message 550 is utilized for establishing a virtual connection between the two ATM switches and includes a protocol discriminator 560, a message type 570, a session number 580, and a pad 590. The protocol discriminator 560 for distinguishing this message format from the message format described in FIG. 7 is also a 32 bit UINT and assigned the value of 0x00000002. The message type 570 is a 32 bit UINT as well and is defined with the following values:

0x00000001–0x00000001: reserved;
0x00000002: Restart;
0x00000003: reserved;
0x00000004: Restart Request;
0x00000005: Restart Complete;
0x00000006: channel Flushed; and
0x00000001–0xFFFFFFFF, reserved.

The session number 580 is a 32 bit UINT and represents the session number assigned to the established virtual connection. Since this is a control message, the pad 590 is set to all zeroes (0) by the transmitter and is ignored by the receiver.

Reference is now made to FIG. 9 illustrating a data message formatted in accordance with the second embodiment of the present invention. The data message 600 is utilized to transport the payload after a virtual session has been established using the above described control messages. The data message 600 includes a packet sequence number 610, a pad 620, and a payload 630. The packet sequence number 610 is a 32 bit UINT and represents the sequence number of the transported payload in a similar manner as described in FIG. 7. The pad 620 is initialized with zeroes and ignored by the receiver. The payload 630 is the AAL5 packet data being sent by the source end-user and exists only within the data message 550.

Procedures for Transmitter Under Second Format:

The transmitter maintains the following variables and timers to effectuate software inverse MUX in accordance with the teachings of the present invention:

T_Seq_N: which stores the sequence number of the
  next Data message to be sent;
T_Session_N: the present session number;
M_Session_N: the session number received from
  Restart or Channel Flushed message from the
  receiver;
T_Ses_Init_Timer: a timer which is set after a
  Restart Request is sent; and
T_Flush Timer: a timer which is set after the
  transmitter sent FD messages to flush the T1 VCs.

The transmitter maintains the following states:

Idle: the transmitter is just created and
  initialized;
Session Initiated: a Restart Request is sent, but
  the corresponding Restart is not yet received;
Flush: a Restart message is received and the
  transmitter has already sent the FD messages to
  flush the T1 VC. It is now waiting for the Channel
  Flushed message from the receiver.
In Session: a session is established. End user AAL5
  packets can be transmitted.

In a similar manner as described in FIG. 7, the initial state of a transmitter after the inverse mux is set up is "idle." A state transition is triggered by an event which is usually represented by an incoming message. The following represents the state machine for the transmitter:

TABLE 3

| STATE | EVENT | NEW STATE | ACTION |
|---|---|---|---|
| Idle | Restart Request Sent (A new T_Session_N is chosen) | Session Initiated | Set the T_Ses_Init_Timer, Set T_Seq_N = 0 |
| Session Initiated | Restart Received and M_Session_N <> T_Session_N (This implies a collision of a Restart Request from the transmitter with a Restart from Receiver. The transmitter give in to the receiver by using the receiver's session number.) | Flush | Clear T_Ses_Init_Timer Set T_Session_N = M_Session_N, Flush all T1 VCs each with 3 FD messages Set T_Flush_Timer |
| Session Initiated | Restart received and M_Session_N = T_Session_N | Flush | Clear T_Ses_Init_Timer Flush all T1 VCs each with 3 FD messages Set T_Flush_Timer |
| Session Initiated | T_Ses_Init_Timer expires | Session Initiated | Send Restart Request with the T_Session_N, reset T_Ses_Init_Timer |
| Flush | Channel Flushed received and M_Session_N = T_Session_N | In Session | Clear T_Flush_Timer Send Restart Completed message Switch the Original VC handler to normal handler |
| Flush | T_Flush_Timer expired | Flush | Flush all T1 VCs each with 3 FD messages. Reset T_Flush_Timer |
| Flush | Restart received and M_Session_N = T_Session_N (The receiver side R_Ses_Init_Timer has expired before it sees at least one T1 VC is flushed. The T_Flush_Timer will takes care of it. So, discard the message.) | Flush | Discard the message |
| Flush | Restart received and M_Session_N <> T_Session_N (Well, the receiver want a new restart. Go with it.) | Flush | Set T_Session_N = M_Session_N. Flush all T1 VCs each with 3 FD messages Set T_Flush_Timer |
| In Session | AAL5 packet received | In Session | Send Data message with T_Session_N and T_Seq_N. T_Seq_N: = T_Seq_N + 1 |
| In Session | Channel Flushed received and M_Session_N = T_Session_N | In Session | Send Restart Complete |
| In Session | Restart received | Flush | Set T_Session_N: = M_Session_N, Set T_Seq_N = 0 Flush all T1 VCs each with 3 FD messages Set T_Flush_Timer Switch the Original VC handler to Restart handler |
| In Session | Restart Request Sent (A new T_Session_N is chosen) (This event is caused by control or management plane. Because we can generally destroy a transmitter and create a new one, I don't see how much this event is necessary. Anyway, it will not increase a lot of coding, therefore, I just include it.) | Session Initiated | Set T_Seq_N = 0 Set the T_Ses_Init_Timer Switch the original VC handler to restart handler. |

Procedures for Receiver Under Second Format:

The receiver maintains the following variables for the second embodiment of the present invention:

R_Seq_N: which stores the sequence number of the next Data message expected;
M_Seq_N: which is the sequence number of the Data message received;

-continued

R_Session_N: the present session number;
R_Ses_Init_Timer: a timer which is set after a Restart is sent;

-continued

M_Session_N: the session number received from Restart Request or Restart Completed message from the transmitter;
Flush_Count[1 to n]: wherein N is the number of T1 VCs the receiver monitors, a counter that counts the FD messages received for a T1 VC during the Flush state.
Data_Received[1 to n]: wherein n is the number of T1 VCs the receiver monitors, a Boolean variable that indicates whether the T1 VC has received a real Data message in the Session Ready state.

The receiver further utilizes the following states:

Idle: the receiver is just created and initialized;
Flush: a Restart is sent, the receiver is waiting far all the T1 VCS to be flushed;
Session Ready: a session is established. End user AAL5 packets can be received.
In Session: every T1 VC is receiving a Data message. This implies that all the FD messages have either arrived at the receiver or lost during the transmission. The receiver can switch to the normal handler.

The following is the state machine for the receiver:

TABLE 4

| STATE | EVENT | NEW STATE | ACTION |
|---|---|---|---|
| Idle | Restart Request received | Flush | Set R_Session_N: = M_Session_N, Set R_Seq_N = 0 Send Restart Set R_Ses_Init_Timer |
| Flush | FD message received from T1 VC(i), i = 1 to n | Flush or Session Ready | Flush_Count[i]: = Flush_Count[i] + 1. If Flush_Count[i] >= 2 then clear R_Ses_Init Timer. If for all j, Flush_Count[j] >= 2, j = 1 to n, then Send Channel Flushed message, set R_Ses_Ready Timer change to "Session Ready" state |
| Flush | R_Ses_Init_Timer expires | Flush | Send Restart Set R_Ses_Init_Timer |
| Flush | Restart Request received (This implies a collision of Restart message from the receiver and a Restart Request message from the transmitter, i.e., the transmitter and receiver send Restart request and Restart messages, respectively, to each other at the same time. The Receiver prevail.) | Flush | Discard the message |
| Session Ready | R_Ses_Ready_Timer expires | Session Ready | Send channel Flushed. Reset R_Ses_Ready_Timer |
| Session Ready | Data message (not FD message) received on T1 VC(i) | Session Ready or In Session | Data_Received[i]: = true Clear R_Ses_Ready_Timer Handle the Data message the same way as that in "In Session" state. If for all j, Data_Received[j] = true then Change to the state "In Session" Switch to normal handler for all T1 VCs |
| Session Ready | FD message received | Session Ready | Discard the message |
| In Session | Data message received | In Session | If M_Seq_N < R_Seq_N (The packet comes too late than circular control algorithm can handle.) then discard the message. If M_Seq_N > R_Seq_N, (The packet comes earlier than it should be. Store in the buffer and wait for other packets to come. Later when other packets come and sequence number is straightened, all the packets will be sent out.) then store the AAL5 packet using the circular control algorithm. If M_Seq_N = R_Seq_N, then use |

TABLE 4-continued

| STATE | EVENT | NEW STATE | ACTION |
|---|---|---|---|
| | | | circular control algorithm to see how many AAL5 packets are in sequence now. Send all the un-sequenced AAL5 packets to the destination end user and update R_Seq_N accordingly. |
| In Session | Restart Request received | Flush | Ask the circular control algorithm to send out all the AAL5 packets stored. Reset the circular control algorithm. Set R_Session_N: = M_Session_N, Set R_Seq_N = 0 Send Restart Set R_Ses_Init_Timer Switch the T1 VC handler to Restart handler. |
| In Session | Initiated a restart (This event may be caused by control or management plane. This may also happen when Receiver found the received Data message is severely out of order for a long period of time.) | Flush | Choose a new R_Session_N Send Restart message Set the R_Ses_Init_Timer Set R_Seq_N: = 0 Switch T1 VC handlers to Restart handlers |

Figure 10:
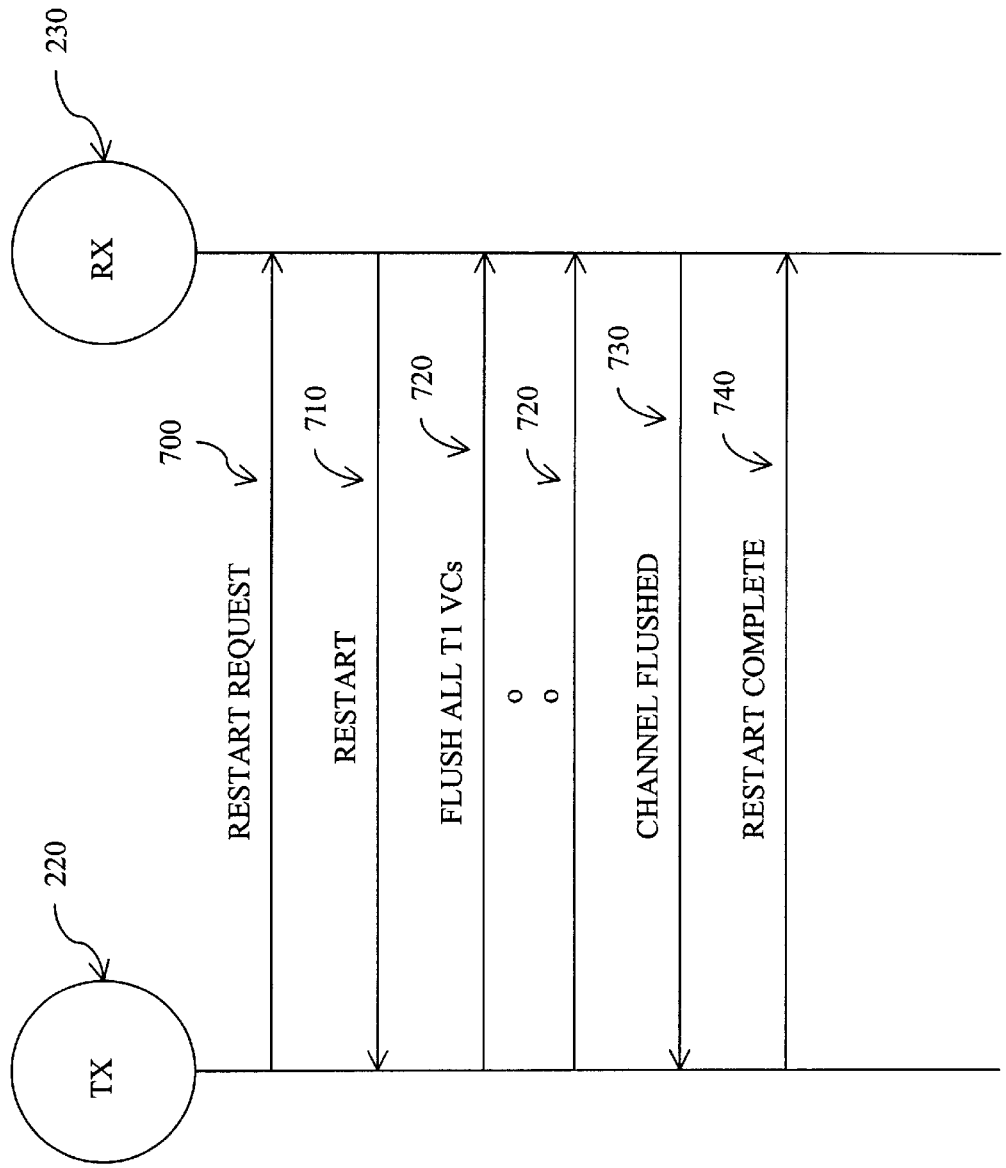
FIG. 10 is a signal sequence diagram illustrating the sequence of signals communicated between two ATM switches to synchronize a virtual connection therebetween.

FIG. 10 is a signal sequence diagram illustrating the sequence of signals communicated between the transmitter and the receiver to synchronize a virtual connection therebetween. The transmitter (Tx, the first ATM switch) 220 sends a Restart Request message 700 over the control channel to initiate a Restart and to establish a virtual connection with the Receiver (Rx, the second ATM switch) 230. The receiver 230 then responds with a Restart Message 710. Upon receiving the Restart Message 710, the transmitter 220 attempts to flush all of the pending ATM cells residing within the selected VC by transmitting a number of special data messages called FD messages whose sequence number is 0×FDFDFDFD and whose payload part is empty. As an illustration, the transmitter 220 sends three (3) FD messages 720 on the T1 VC and initiates a flush timer (T_Flush_Timer).

The receiver 230, after receiving at least two consecutive FD data messages 720, determines that the VC has been flushed and ready and responds with a Channel Flushed message 730 to the transmitter 220. The transmitter 220 thereafter receives the Channel Flushed message 730, resets the flush timer, and sends a Restart Complete message 740 to the receiver 230. The transmitter now considers the synchronization to be completed and is ready to transmit data messages.

One problem the receiver has to deal with is to recover the sequence of the AAL5 packets once they are received out-of-order over a plurality of VCs. The nature of the ATM transmission is such that it is allowed to lose an AAL5 packet, but is not allowed to receive the packets out of order. Accordingly, the receiver needs to recognize when a packet has been lost or delivered a bit late and properly re-synchronize the received packets.

Figure 11:
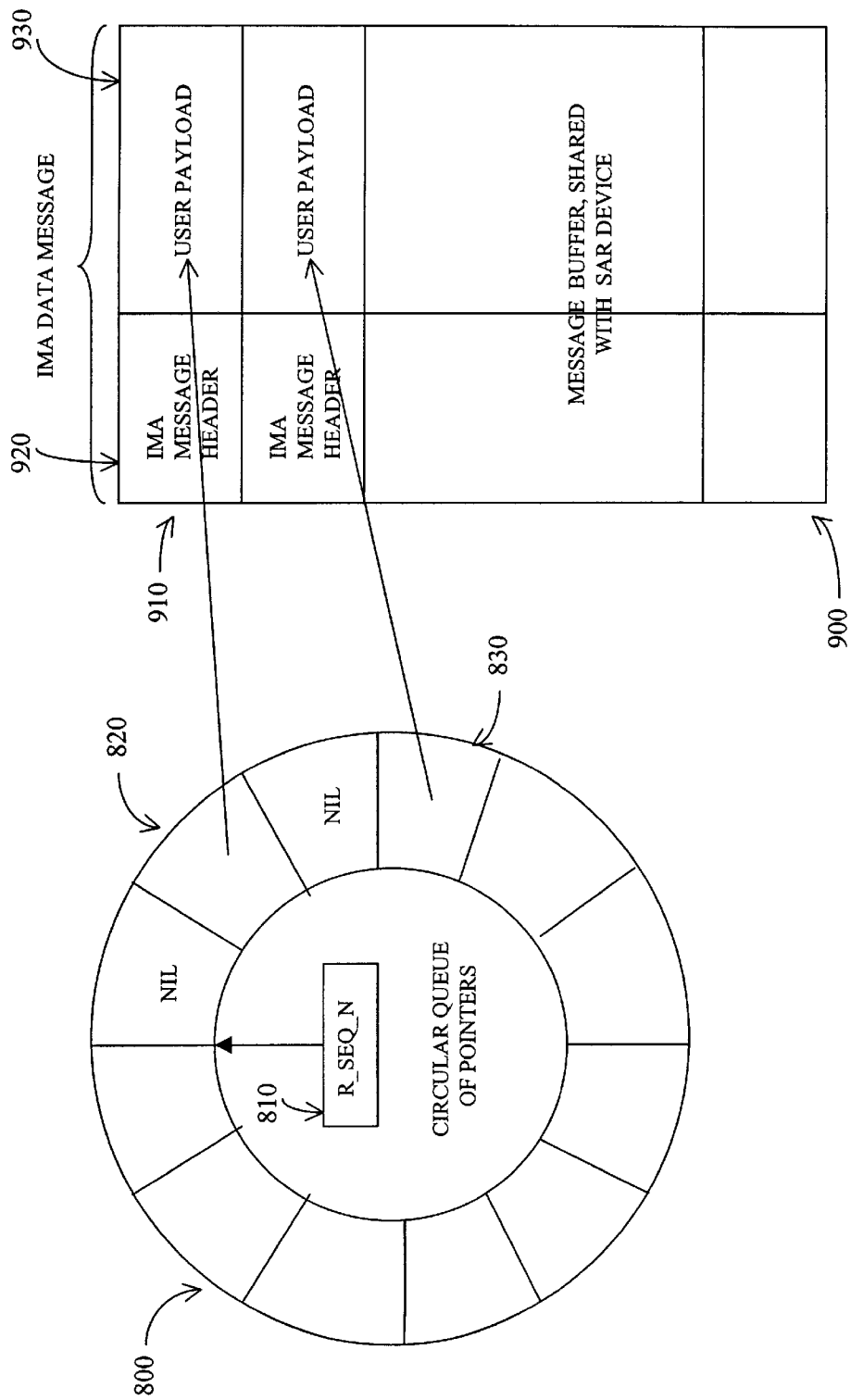
FIG. 11 is a block diagram illustrating a circular buffer to be used by a receiving ATM switch for re-synchronizing user packets received over a plurality of low-bandwidth communication links.

In accordance with the teachings of the present invention, FIG. 11 is a block diagram illustrating a circular buffer to be used by a receiving ATM switch for re-synchronizing the user packets received over a plurality of low-bandwidth communication links.

A memory device known as a message buffer 900 is shared between the CPU and SAR module associated with the receiving ATM switch. The message buffer 900 stores the IMA messages received over the plurality of low-bandwidth communication links from the transmitting ATM switch. Referring back to FIG. 7, an IMA message is consisted of a sixteen (16) byte IMA message header, and a variable size user payload. In FIG. 11, each record 910 is large enough to store the received IMA message. Accordingly, the first portion 920 stores the received IMA message header data, and the second portion 930 stores the received user payload.

The receiving ATM switch maintains a circular queue of pointers 800 to keep track of the status of the received messages. For descriptive purposes, the label CQ is used to represent the circular queue and CQ(I) to represent a particular element of the circular queue. An element of CQ is either a NIL (initialized value not pointing to any particular record within the message buffer 900) or a pointer value 820,830 pointing to the beginning part of the user payload part 930 of a particular record 910 within the message buffer 900. The head of the circular queue is pointed to by a data structure comprising two components: the Head.N variable component which stores the current value of R_Seq_N 810 (sequence number of the next Data Message expected), and the Head.H variable component which stores the index to the head element of the circular queue 800. The following additional variables are further utilized by the circular queue:

LQ: the size of the circular queue;
M_P: the pointer that points to the IMA message -continued

```
        just received. It is passed from SAR to
        CPU;
    User_Payload_P: the pointer that points to the
        user payload part of the IMA message
        pointed to by M_P;
    Severely_Out_Of_Order_Count: the counter that
        counts the number of times a message is
        arrived earlier than the circular queue can
        handle; and
    D: an integer value that represents the distance
        between the actually received IMA message
        and the message the receiver is expecting.
```

With the following variables, the circular queue 800 and the message buffer 900 function in the following manner. When a data message is assembled by the SAR module associated with the receiving ATM switch, the SAR module interrupts the CPU and passes the M_P pointer pointing to the IMA message just received to the CPU. The CPU evaluates the received message type stored within the received message and determines that the message is a data message. The User_Payload_P pointer value is then calculated by adding sixteen (16) bytes to the M_P pointer value. The User_Payload_P pointer now points to the payload portion of the received message. The circular queue then determines whether the received message is out of sequence and re-synchronization is necessary. If the message is received too early or too late and cannot be handle with the current storage capacity associated with the message buffer 900 and the circular queue 800, that particular message is discarded. As an example, if the message buffer 900 has enough memory space to handle thirty (30) messages, and after receiving the first message, the thirty-first message is received prior to receiving any other messages therebetween, the thirty-first message cannot be accommodated by the circular queue and is discarded. The algorithm for re-synchronizing the received messages are described using the following pseudo language descriptions:

```
    D = M_Seq_N - R_Seq_N
    If D < 0 then (* this message arrived too late *)
        Discard this message and Exit;
    If D >= LQ then (* this message arrived too early and
                the size of the CQ cannot handle
                this message *)
        The connection is severely out of order;
        Transmit whatever messages are stored within the
            message buffer including the newly received
            message;
        R_Seq_N = M_Seq_N + 1;
        Any messages with sequence number less than
            M_Seq_N is to be discarded when received;
        Severely_Out_Of_Order_Count increased by 1;
        Exit;
    If (D > 0) then (* message arrived earlier than
            expected, but the CQ capacity can handle it *)
        CQ (Head.H + D) = User_Payload_P;
        Exit;
    (* At this point, D must be 0, and the message is what
        the receiver is expecting. Transmit this message
        along with all other synchronized messages stored
        within the message buffer *)
    Send the user pay load to the SAR module for
        transmission;
    For (I = 1; I < LQ; I ++)
        If CQ(j = (Head.H + I) Mod LQ)) then
            Send CQ(j) to SAR module and Nil the
                pointer;
        Else
            Break;
    R_Se_N = R_Seq_N + 1;
    Head.H = (Head.H + 1) Mod LQ;
    Exit;
```

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An asynchronous transfer mode (ATM) communication network, comprising:
   a first communication link;
   a plurality of second communication links;
   a first ATM switch connected to said first communication link for receiving a stream of ATM cells;
   a first application module associated with said first ATM switch for:
      associating said stream of ATM cells into a plurality of sub-streams wherein all of said ATM cells associated with a particular sub-stream are associated with a particular user packet; and
      transmitting said plurality of sub-streams over said plurality of second communications links wherein all ATM cells associated with particular one of said plurality of sub-streams are transmitted over particular one of said second communications link;
   a second ATM switch connected to said plurality of second communication links for receiving said plurality of sub-streams; and
   a second application module associated with said second ATM switch for re-assembling said plurality sub-streams into said stream of ATM cells.

2. The ATM communication network of claim 1 wherein said first ATM switch further comprises a first segmentation and re-assembly (SAR) module for assembling particular ones of said received ATM cells into a user packet.

3. The ATM communication network of claim 2 wherein said first ATM switch further comprises a central processing unit (CPU) for receiving said user packet assembled by said first SAR module, adding control data to said assembled user packet to generate a modified user packet, and instructing said first SAR to transmit said modified user packet over a particular one of said plurality of second communication links.

4. The ATM communication network of claim 3 wherein said control data comprises a sequence number identifying the order of said modified user packet in relation to the rest of the user packets within said stream of ATM cells.

5. The ATM communication network of claim 3 wherein said control data comprises a session number identifying a virtual connection between said first ATM switch and said second ATM switch.

6. The ATM communication network of claim 3 wherein said CPU transmits a plurality of modified user packets with a particular data value to synchronize a communication link between said first ATM switch and said second ATM switch.

7. The ATM communication network of claim 3 wherein said first SAR segments said modified user packet into a plurality of ATM cells and transmits said plurality of ATM cells over said particular one of said plurality of second communication links.

8. The ATM communication network of claim 7 wherein said second ATM switch further comprises:

a plurality of memory registers;

a circular buffer for storing a plurality of memory addresses, each of said memory addresses pointing to particular one of said plurality of memory registers; and a second SAR for re-essembling said plurality of ATM cells received over said particular one of said plurality of second communication links into said modified user packet and storing said modified user packet within one of said plurality of memory registers.

9. The ATM communication network of claim 3 wherein said CPU further comprises a plurality of registers, each of said registers storing data representing the traffic level associated with particular one of said plurality of second communication links.

10. The ATM communication network of claim 9 wherein said CPU selects a particular one of said plurality of second communication links to transmit said modified packet by evaluating said plurality of registers.

11. The ATM communication network of claim 2 wherein said first ATM switch further comprises a routing table (RT) for forwarding said stream of received ATM cells to said first SAR.

12. An asynchronous transfer mode (ATM) communication switch connected to a first communication link for receiving a plurality of ATM cells and to a plurality of second communication links for transmitting said plurality of ATM cells, said ATM communication switch comprising:

a switching component for receiving said plurality of ATM cells over said first communication link;

a segmentation and re-assembly (SAR) module for assembling said plurality of ATM cells into a plurality of user packets;

a central processing unit (CPU) for associating particular one of said plurality of user packets with particular one of said plurality of second communication links; and wherein said SAR module further segments said particular one of said plurality of user packets into a plurality of second ATM cells and transmits all of said plurality of second ATM cells over said particular second communication link.

13. The ATM communication switch of claim 12 wherein said CPU is associated with a plurality of registers, each of said plurality of registers storing data representing traffic level associated with particular one of said plurality of second communication links.

14. The ATM communication switch of claim 12 wherein said CPU adds control data to each of said plurality of user packets, said control data within each user packet representing the position of said user packet with respect to the rest of said plurality of user packets.

15. The ATM communication switch of claim 12 further connected to a receiver ATM communication switch, and wherein said CPU transmits a control message over particular one of said plurality of second communication links to initiate a virtual connection with said receiver ATM communication switch.

16. An asynchronous transfer mode (ATM) communication switch connected to a plurality of communication link for receiving a plurality of ATM cells and to a second communication link for transmitting said plurality of ATM cells, said ATM communication switch comprising:

a switching component for receiving said plurality of ATM cells over said first communication links;

a segmentation and re-assembly (SAR) module for assembling said plurality of ATM cells into a plurality of user packets wherein all of said ATM cells assembled into particular one of said user packets are received over particular one of said plurality of first communication links;

a central processing unit (CPU) for associating with said SAR module for synchronizing said received plurality of user packets; and wherein said SAR module further de-assembles each of said plurality of user packets into a stream of ATM cells and transmits stream of ATM cells over said second communication link.

17. The ATM communication switch of claim 16 wherein said plurality of user packets comprise a ATM Adaptation Layer 5 (AAL5) packet.

18. The ATM communication switch of claim 16 wherein said CPU further comprises a circular buffer for storing and synchronizing said plurality of user packets assembled by said SAR module.

19. The ATM communication switch of claim 16 wherein each of said plurality of user packets includes control data for synchronizing said user packet with the rest of said plurality of user packets, said CPU removing said control data stored within each of said user packets assembled by said SAR module.

20. The ATM communication switch of claim 19 wherein said control data comprises a sequence number for synchronizing each of said user packets with the rest of said plurality of user packets.

21. A method for routing a stream of asynchronous transfer mode (ATM) cells received over a high bandwidth communication link over a plurality of low bandwidth communication links, said method comprising the steps of:

receiving a stream of ATM cells over said high bandwidth communication link;

assembling said stream of ATM cells into a plurality of user packets, each of said user packets comprising one or more of said received ATM cells;

adding control data to each of said plurality of user packets to generate a plurality of modified user packets, said control data representing the position of said each user packet with respect to the rest of said plurality of user packets;

de-assembling each of said plurality of modified user packets into a second stream of ATM cells; and routing said second stream of ATM cells over particular one of said plurality of high bandwidth communication links.

22. The method of claim 21 wherein said steps of assembling and de-assembling are performed by a segmentation and re-assembly (SAR) module associated with an ATM communication switch connected to said high bandwidth communication link and to said plurality of low bandwidth communication links.

23. The method of claim 21 wherein said step of adding said control data to said each of said plurality of user packets comprises the step of adding a sequence number associated with each of said user packets.

24. The method of claim 21 wherein said step of routing said associated stream of ATM cells over said plurality of high bandwidth communication links further comprises the step of routing all of the ATM cells belonging to a particular modified user packet over a particular one of said plurality of high bandwidth communication link.

\* \* \* \* \*

UNITED STATES PATENT AND TRADEMARK OFFICE
CERTIFICATE OF CORRECTION

PATENT NO : 6,134,246

DATED : October 17, 2000

INVENTOR(S) : Biaodong Cai, et al

It is certified that error appears in the above-identified patent and that said Letters Patent are hereby corrected as shown below:

Column 4, line 6, (Specification page 10, line 1) delete "DETAILED DESCRIPTION OF THE DRAWINGS" and insert -- DETAILED DESCRIPTION OF THE PREFERRED EMBODIMENT --

Column 24, line 29 (Specification page 46, line 16), after "transmits" insert -- said --.

Signed and Sealed this

Twenty-ninth Day of May, 2001

Attest:

NICHOLAS P. GODICI

Attesting Officer     *Acting Director of the United States Patent and Trademark Office*